United States Patent [19]

Davis

[11] Patent Number: 5,433,671
[45] Date of Patent: Jul. 18, 1995

[54] WATER AMUSEMENT RIDE

[76] Inventor: Walter D. Davis, 5446 Hamilton Rd., Lebanon, Ohio 45036

[21] Appl. No.: 173,902

[22] Filed: Dec. 27, 1993

[51] Int. Cl.⁶ .............................................. A63G 21/18
[52] U.S. Cl. .................................... 472/117; 472/128; 104/70; 104/57
[58] Field of Search ................... 472/117, 128, 129; 104/69, 70, 86, 56, 57, 73; 193/25 R, 27

[56] References Cited

U.S. PATENT DOCUMENTS

| | | | |
|---|---|---|---|
| 913,243 | 2/1909 | Sonntag | 104/57 |
| 3,635,185 | 1/1972 | Kojima | 104/56 |
| 4,805,896 | 2/1989 | Moody | 272/56.5 |
| 4,805,897 | 2/1989 | Dubeta | 472/117 |
| 4,836,521 | 6/1989 | Barber | 272/32 |
| 4,910,814 | 3/1990 | Weiner | 472/117 |

OTHER PUBLICATIONS

"The American Heritage Dictionary" p. 68.

*Primary Examiner*—Carl D. Friedman
*Assistant Examiner*—Kien T. Nguyen
*Attorney, Agent, or Firm*—Killworth, Gottman, Hagan & Schaeff

[57] ABSTRACT

A transport device is provided for transporting a water ride participant from a first elevation to a second, higher elevation. The device includes a spiral transport element extending generally between the first and second elevations. The spiral transport element has first and second end sections, an intermediate section and an inner surface extending along the intermediate and first and second end sections. The inner surface defines a spiral pathway between the first and second elevations. Further provided is a drive mechanism coupled to the spiral transport element for effecting rotation of the transport element such that the first end section of the transport element is capable of receiving a participant at the first elevation and the second end portion is capable of releasing the participant at the second elevation after the participant has traveled along the spiral pathway from the first elevation to the second, higher elevation.

11 Claims, 4 Drawing Sheets

WATER AMUSEMENT RIDE

BACKGROUND OF THE INVENTION

This invention relates generally to water amusement rides and, more particularly, to a water amusement ride having a device for transporting ride participants from a first elevation to a second, higher elevation.

Water amusement rides are common in the prior art. One known water amusement ride comprises a downward sloping channel or like structure having an upper surface over which water flows and upon which participants are permitted to travel down under the influence of gravity. The participants move down the sloping channel either alone or while riding on an inner tube or some other carrier device. After reaching the bottom of the channel, the participants usually must climb a hill or a tower to again reach the entrance of the channel. Oftentimes, the participants must also stand in line before being permitted to access the ride. Accordingly, such rides are considered to be less than optimum because of the discomforts associated with walking up a hill or climbing stairs in a tower as well as with standing in line in the open air or hot sun while in a bathing suit.

Another known water ride is referred to as a "lazy river" or "meandering river" ride. These attractions are long, circuitous pools of water forming closed loops of various lengths. Participants either enter the water as swimmers or ride upon the water on an inner tube or some other carrier device. The swimmers or carrier devices are permitted to circle the loop continuously without leaving the water. These attractions are constructed on level ground. Hence, these attractions are costly to install, especially if the ride extends for a long distance.

Accordingly, there is a need for a device for transporting water amusement ride participants from a lower end of a downward sloping channel or like structure to its entrance located at a higher elevation. There is further a need for a device which allows "lazy river" or "meandering river" rides to be built on ground that is not level.

SUMMARY OF THE INVENTION

These needs are met by the method and apparatus of the present invention, wherein a spiral transport device is provided which is capable of gathering an amusement ride participant and/or a given quantity of water from a pool of water located at a first elevation and transporting same to a second, higher elevation.

In accordance with a first aspect of the present invention, a device is provided for transporting a water ride participant from a first elevation to a second, higher elevation. The device includes a spiral transport element extending generally between the first and second elevations. The spiral transport element has first and second end sections, an intermediate section and an inner surface extending along the intermediate and first and second end sections. The inner surface defines a spiral pathway extending between the first and second elevations. Further provided is a drive mechanism coupled to the spiral transport element for effecting rotation of the transport element such that the first end section of the transport element is capable of receiving a participant at the first elevation and the second end section is capable of releasing the participant at the second elevation after the participant has traveled along the spiral pathway from the first elevation to the second, higher elevation.

Preferably, the spiral transport element comprises a spiral flume, a rotatable shaft and means for fixedly connecting the spiral flume to the shaft. The spiral flume comprises a plurality of fiberglass flume sections fixedly connected to one another by fasteners. Alternatively, the spiral transport element may comprise a spiral tube having an inclined axis, a rotatable shaft and means for fixedly connecting the spiral tube to the shaft.

In accordance with a second aspect of the present invention, an amusement water ride is provided which includes a downward sloping element having an upper surface over which water flows and upon which a participant is capable of moving under the influence of gravity from a first end of the sloping element to a second, lower end of the sloping element. The second, lower end is located generally at a first elevation and the first end is located generally at a second, higher elevation. The water ride further includes a pool of water located generally at the first elevation and a spiral transport device for retrieving the participant from the pool of water and transporting the participant to the second elevation where the participant is released at the first end of the sloping element.

The spiral transport device may comprise a spiral transport element and a drive mechanism as discussed above with respect to the first aspect of the present invention.

In accordance with a third aspect of the present invention, a method is provided for transporting a water amusement ride participant from a first elevation to a second, higher elevation. The method comprises the steps of: providing a transport device having a spiral transport element extending between the first and second elevations; receiving a participant at a first end section of the spiral transport element while the first end section is at the first elevation; transporting the participant via the spiral transport element from the first elevation to the second elevation; and, releasing the participant from a second end section of the spiral transport element at the second elevation.

The step of transporting the participant along the spiral transport element comprises the step of rotating the spiral transport element via a drive mechanism such that the participant is carried along an inner surface of the spiral transport element from the first elevation to the second elevation.

The step of receiving a participant at a first end section of the spiral transport element comprises the step of retrieving a participant and a given quantity of water from a pool of water with a first end section of the spiral transport element. Alternatively, the step of receiving a participant at a first end section of the spiral transport element comprises the step of retrieving a carrier supporting at least one participant and a given quantity of water from a pool of water with a first end section of the spiral transport element.

Accordingly, it is an object of the present invention to provide a spiral transport device which is capable of transporting a person and/or water from a first elevation to a second, higher elevation. It is further an object of the present invention to provide a water amusement ride which includes a spiral transport device for transporting an amusement ride participant from a first elevation to a second, higher elevation. It is another object of the present invention to provide an improved water transport device for a water amusement ride. These and

DETAILED DESCRIPTION OF THE INVENTION

Figure 1:
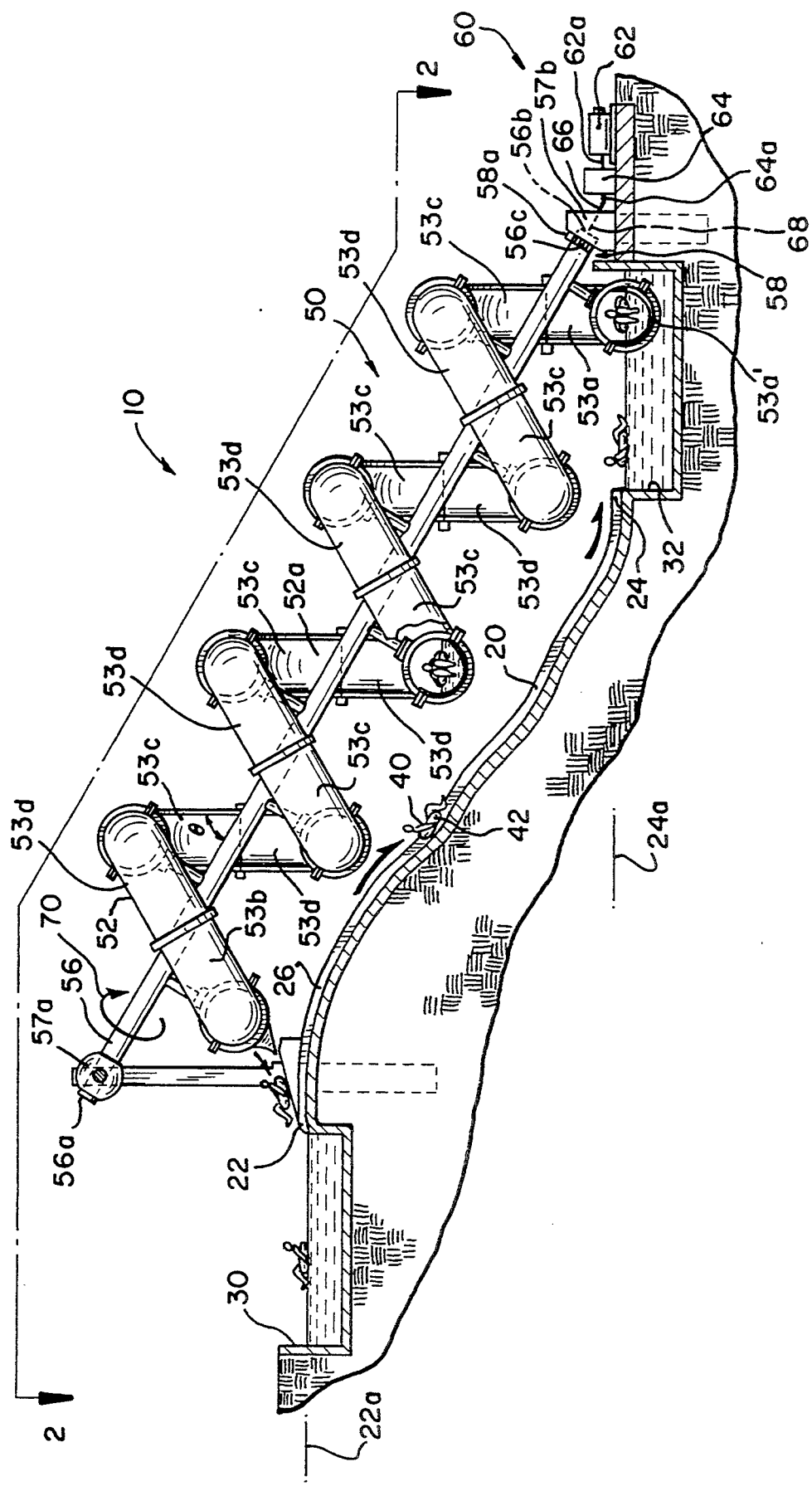
FIG. 1 is a side view, partially in section, of a water amusement ride constructed in accordance with the present invention.
Figure 2:
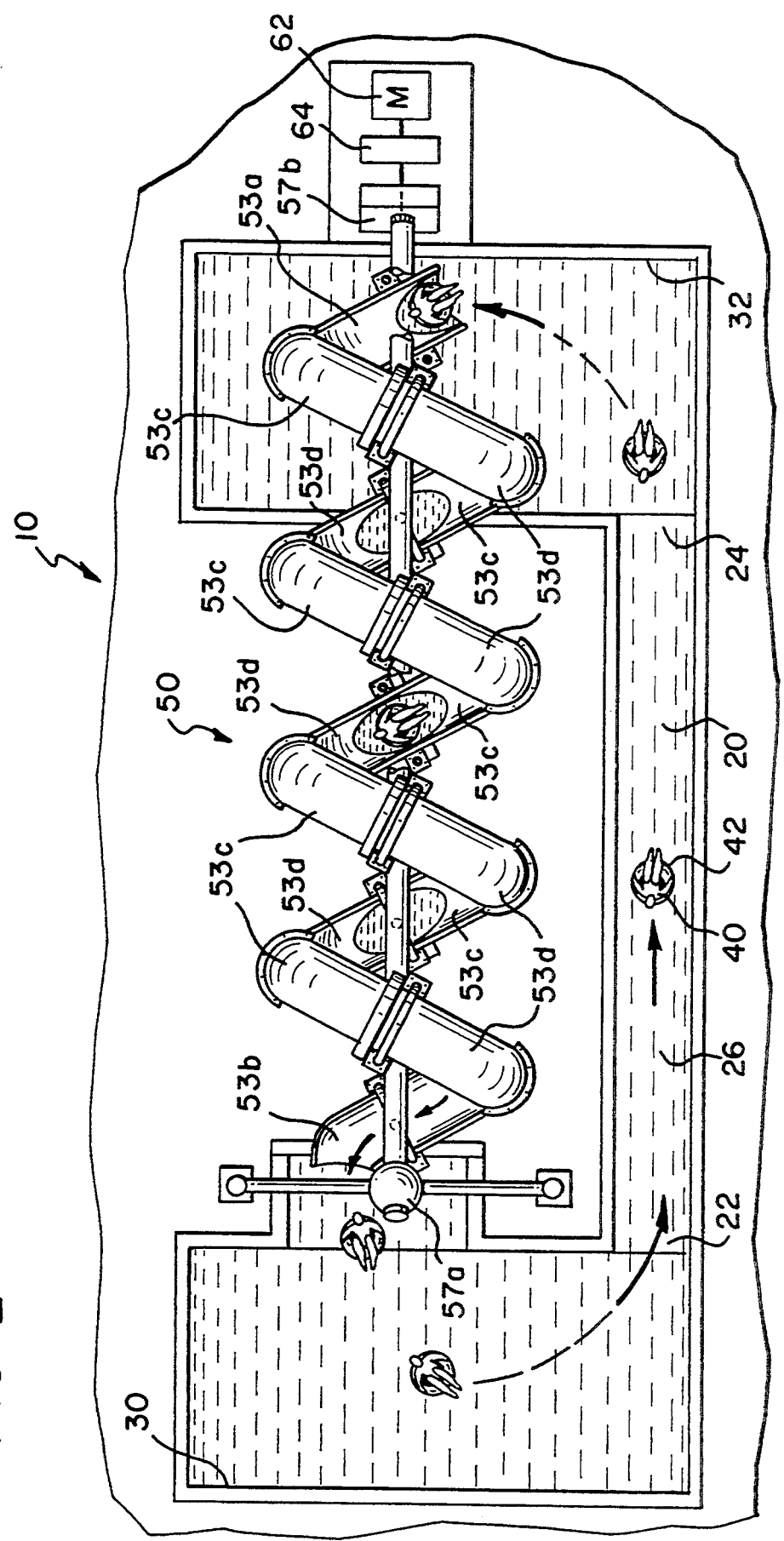
FIG. 2 is a view taken along line 2—2 in FIG. 1.

FIGS. 1 and 2 show a water ride 10 constructed in accordance with the present invention. The water ride 10 includes a downward sloping flume 20 constructed from fiberglass, concrete or other like material. An upper pool 30 is positioned adjacent to a first end 22 of the flume 20 and a lower pool 32 is positioned adjacent to a second end 24 of the flume 20. The pools 30 and 32 are constructed from concrete or other suitable material. The second end 24 of the flume 20 is located generally at a first elevation 24a and the first end 22 of the flume 20 is located generally at a second, higher elevation 22a. The flume 20 has an upper surface 26 over which water flows from the upper pool 30 down to the lower pool 32.

A participant 40 and an accompanying inner tube 42, after entering the flume 20 at its first end 22, travel under the influence of gravity down the upper surface 26 of the flume 20 until exiting the flume 20 at its second end 24, see FIGS. 1 and 2. After leaving the flume 20, the participant 40 and his inner tube 42 enter the lower pool 32. The participants 40 shown in FIGS. 1 and 2 are each provided with an inner tube 42. However, tile participants 40 may travel down the flume 20 alone without an inner tube 42. The participants 40 may also travel down the flume 20 on another carrier device (not shown) which is capable of supporting two or more participants.

The water ride 10 further includes a spiral transport device 50 for transporting a participant 40 from the lower pool 32 to the upper pool 30. The device 50 includes an inclined spiral flume 52 and a rotatable shaft 56. The rotatable shaft 56 is positioned at an angle of approximately 30° with horizontal. The upper end 56a of the shaft 56 is rotatably supported within a conventional roller bearing 57a and the lower end 56b of the shaft 56 is rotatably supported within a conventional thrust bearing 57b.

Figure 3:
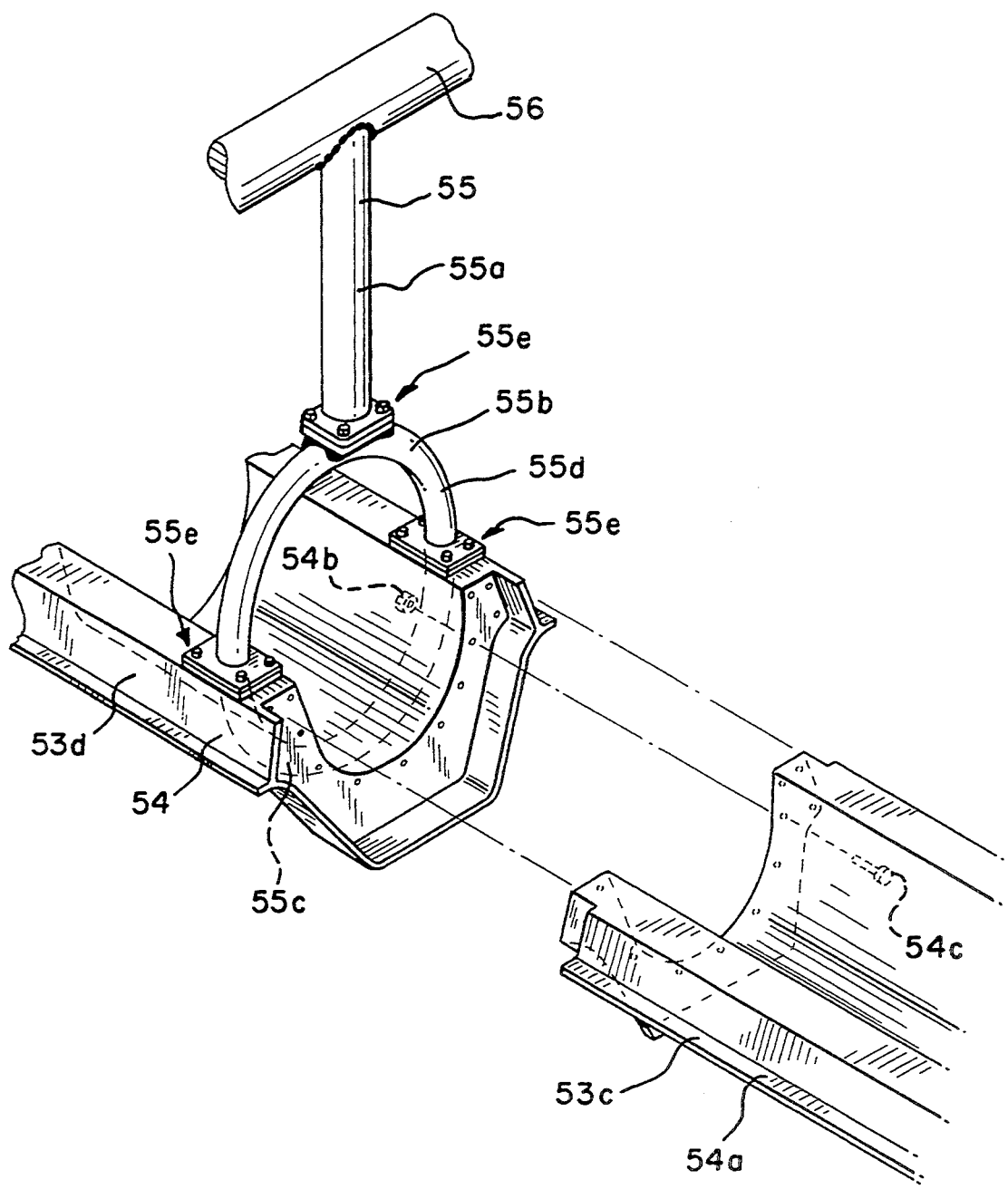
FIG. 3 is a perspective exploded view showing two end portions of adjacent flume sections, with one of the end portions having a shaft connector; and, FIG. 4 is a perspective exploded view showing two end portions of adjacent flume sections with neither end portion having a shaft connector.
Figure 4:
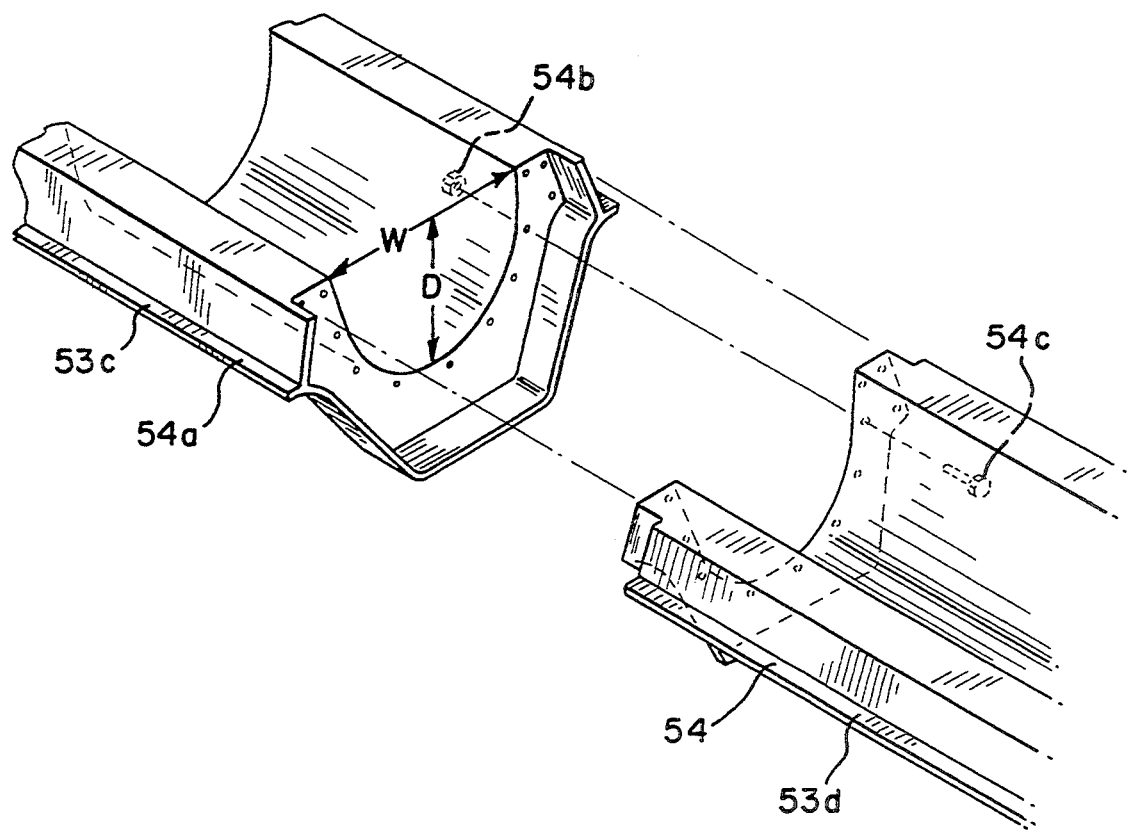

The flume 52 includes an entrance flume section 53a, an exit flume section 53b and alternating first and second intermediate flume sections 53c and 53d. The entrance and exit flume sections 53a and 53b and the second intermediate flume sections 53d each comprise a fiberglass main body portion 54 and a connector 55 provided at one end of the main body portion 54 for fixedly connecting the main body portion 54 to the shaft 56, see FIG. 3. The connector 55 comprises an arm 55a and a securement ring 55b. The arm 55a extends into and is weldedly secured to the shaft 56. The securement ring 55b has a first portion 55c which is embedded within the fiberglass main body portion 54 and a second portion 55d which is fixedly secured to the first portion 55c and the arm 55a via bolted flange connections 55e. Each of the first intermediate flume sections 53c comprises a fiberglass main body portion 54a, see FIGS. 3 and 4. The first intermediate flume sections 53c are not provided with connectors 55 in the illustrated embodiment. The flume sections 53a–53d are fixedly connected to one another via nuts 54b and bolts 54c. The angle θ, which is the angle of inclination of the flume 52 with respect to the shaft 56, is approximately 60°, see FIG. 1. Main body portions 54 and 54a may be formed from a material other than fiberglass, such as stainless steel.

The flume 52 has an inner surface 52a which extends along the flume sections 53a–53d and defines a spiral pathway between the first and second elevations 24a and 22a. The inner surface 52a has a width W of approximately 50 inches and a depth D of approximately 30 inches, see FIG. 4. Of course, these dimensions may be varied. For example, if larger carrier devices are used, the flume sections 53a–53d would be larger to accommodate those devices.

A drive mechanism 60 is coupled to the shaft 56 for effecting rotation of the shaft 56 and, hence, the spiral flume 52. The drive mechanism 60 comprises an electric motor 62 having a drive shaft 62a coupled to a gearbox 64. The gearbox 64 has an output shaft 64a which is coupled to the shaft 56 via a conventional universal joint 66 and an intermediate shaft 68. The gearbox 64 serves to increase the torque and reduce the rotational speed transmitted by the motor 62 to the shaft 56. Typically, the rotational speed of the shaft 56 is approximately 3 RPM. The rotational speed, however, may be varied.

An anti-rollback device 58 is provided to prevent backward rotation of the shaft 56 in the event of a power or mechanical failure. The anti-rollback device 58 comprises a ratchet pawl 58a spring-biased against a plurality of gear teeth 56c provided circumferentially on a lower portion of the shaft 56. The pawl 58a only permits movement of the shaft 56 in the clockwise direction.

During use, a participant 40 is received from the lower pool 32 by the entrance section 53a of the flume 52 along with a given quantity of water as the end portion 53a' of the entrance section 53a rotates through the lower part of its circular arc, see FIG. 1. The amount of water received by the section 53a will depend upon the depth to which the end portion 53a' passes below the water line of the lower pool 32. In the illustrated embodiment, since the participant 40 is carried on an inner tube 42, a sufficient quantity of water is gathered by the section 53a to allow the inner tube 42 and the participant 40 to move easily upward along the inner surface 52a of the flume 53 as the flume 53 rotates. If the participant 40 travels alone without an inner tube 42, less water may be gathered by the section 53a. Once the participant 40 has been received in the section 53a, the participant 40 is carried upward by the flume 52 along its inner surface 52a due to the rotation of the flume 52. Eventually, the participant 40 is released to the upper pool 30 via the exit section 53b. The flume 52 is rotated in a clockwise direction as represented by arrow 70 in FIG. 1.

A pump (not shown) may be provided to assist the flume 52 in returning water from the lower pool 32 to the upper pool 30. Further, the flume 52 may be used solely to return water from the lower pool 32 to the upper pool 30.

It is also contemplated by the present invention that the transport device 50 could form part of a "lazy river" or "meandering river" ride (not shown) for transporting a participant or carrier device and a given quantity of water from a first elevation to a second, higher elevation. Such an attraction could employ more than one transport device 50. Also, a transport device 50 could be used in such attractions solely to return water from a lower pool to an upper pool.

It is further contemplated by the present invention that a spiral tube (not shown) could be substituted for the spiral flume.

It is additionally contemplated by the present invention that the transport device could comprise an inclined cylindrical tube having a broad-threaded screw therein for moving carrier devices from a first elevation to a second, higher elevation.

Having described the invention in detail and by reference to preferred embodiments thereof, it will be apparent that modifications and variations are possible without departing from the scope of the invention defined in the appended claims.

What is claimed is:

1. A water ride comprising:
   a downward sloping element having an upper surface over which water flows and upon which a participant is capable of moving under the influence of gravity from a first end of said sloping element to a second, lower end of said sloping element, said second, lower end being located generally at a first elevation and said first end being located generally at a second, higher elevation;
   a pool of water located generally at said first elevation; and,
   a spiral transport device for retrieving said participant from said pool of water and transporting said participant to said second elevation where said participant is released at said first end of said sloping element.

2. A water ride as set forth in claim 1, wherein said spiral transport device comprises:
   a spiral transport element extending generally between said first and second elevations, said spiral transport element having first and second end sections, an intermediate section and an inner surface extending along said intermediate and first and second end sections, said inner surface defining a spiral pathway between said first and second elevations; and
   a drive mechanism coupled to said transport element for effecting rotation of said spiral transport element such that said first end section of said transport element is capable of retrieving said water ride participant from said pool of water and said second end section is capable of releasing said participant at said first end of said sloping element after said participant has traveled along said spiral pathway to said second, higher elevation.

3. A water ride as set forth in claim 2, wherein said spiral transport element comprises a spiral flume, a rotatable shaft and means for fixedly connecting said spiral flume to said shaft.

4. A water ride as set forth in claim 3, wherein said spiral flume comprises a plurality of fiberglass flume sections fixedly connected to one another by fasteners.

5. A water ride as set forth in claim 2, wherein said spiral transport element comprises a spiral tube, a rotatable shaft and means for fixedly connecting said spiral tube to said shaft.

6. A water ride as set forth in claim 2, wherein said first end section of said spiral transport element is capable of receiving a carrier for supporting at least one participant.

7. A method of transporting a water amusement ride participant from a first elevation to a second, higher elevation, said method comprising the steps of:
   providing a transport device having a spiral transport element extending between said first and second elevations;
   receiving a water ride participant and a given quantity of water from a pool at a first end section of said spiral transport element while said first end section is at said first elevation;
   transporting said water ride participant and said given quantity of water via said spiral transport element from said first elevation to said second elevation; and
   releasing said participant and said given quantity of water from a second end section of said spiral transport element at said second elevation.

8. A method as set forth in claim 7, wherein said spiral transport device further includes a drive mechanism for effecting rotation of said spiral transport element.

9. A method as set forth in claim 8, wherein said step of transporting said participant along said spiral transport element comprises the step of rotating said spiral transport element via said drive mechanism such that said participant is carried along an inner surface of said spiral transport element which defines a spiral pathway between said first and second elevations.

10. A method as set forth in claim 8, wherein said step of receiving a participant and a given quantity of water from a pool at a first end section of said spiral transport element is performed by retrieving a carrier supporting at least one participant and a given quantity of water from a pool of water with said first end section of said spiral transport element.

11. A water ride comprising:
   a downward sloping element having an upper surface over which water flows and upon which a participant is capable of moving under the influence of gravity from a first end of said sloping element to a second, lower end of said sloping element, said second, lower end being located generally at a first elevation and said first end being located generally at a second, higher elevation;
   a pool of water located generally at said first elevation; and,
   a spiral transport device for retrieving a given quantity of water from said pool and transporting said water to said second elevation where said water is released at said first end of said sloping element.

* * * * *